Figures 1, 2:
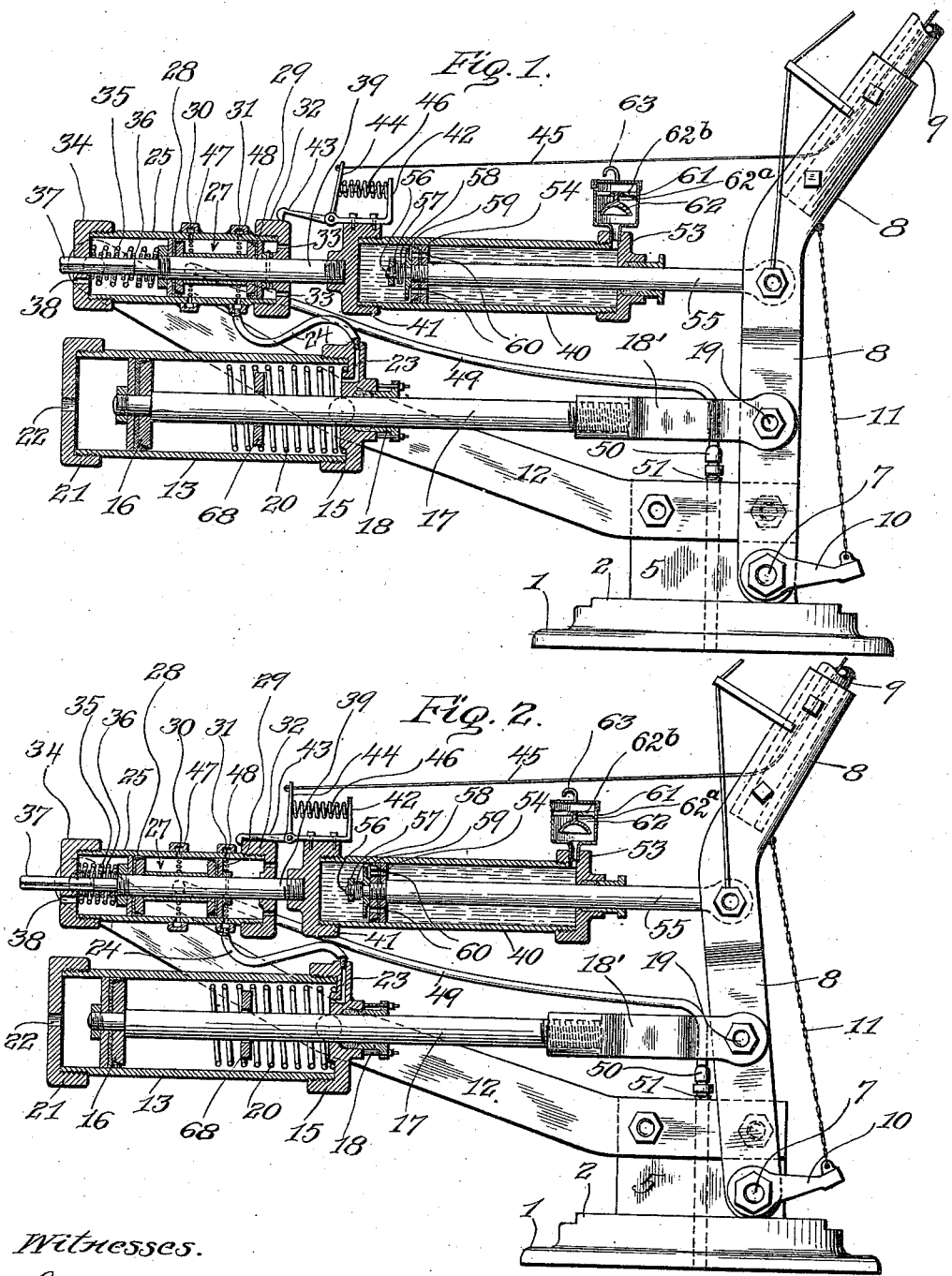

J. W. LANG.
AUTOMATIC TROLLEY POLE.
APPLICATION FILED AUG. 11, 1909.

984,767.

Patented Feb. 21, 1911.
2 SHEETS—SHEET 1.

Witnesses.
Geo. J. Huting.
Louis W. Gratz.

Inventor:
James W. Lang.

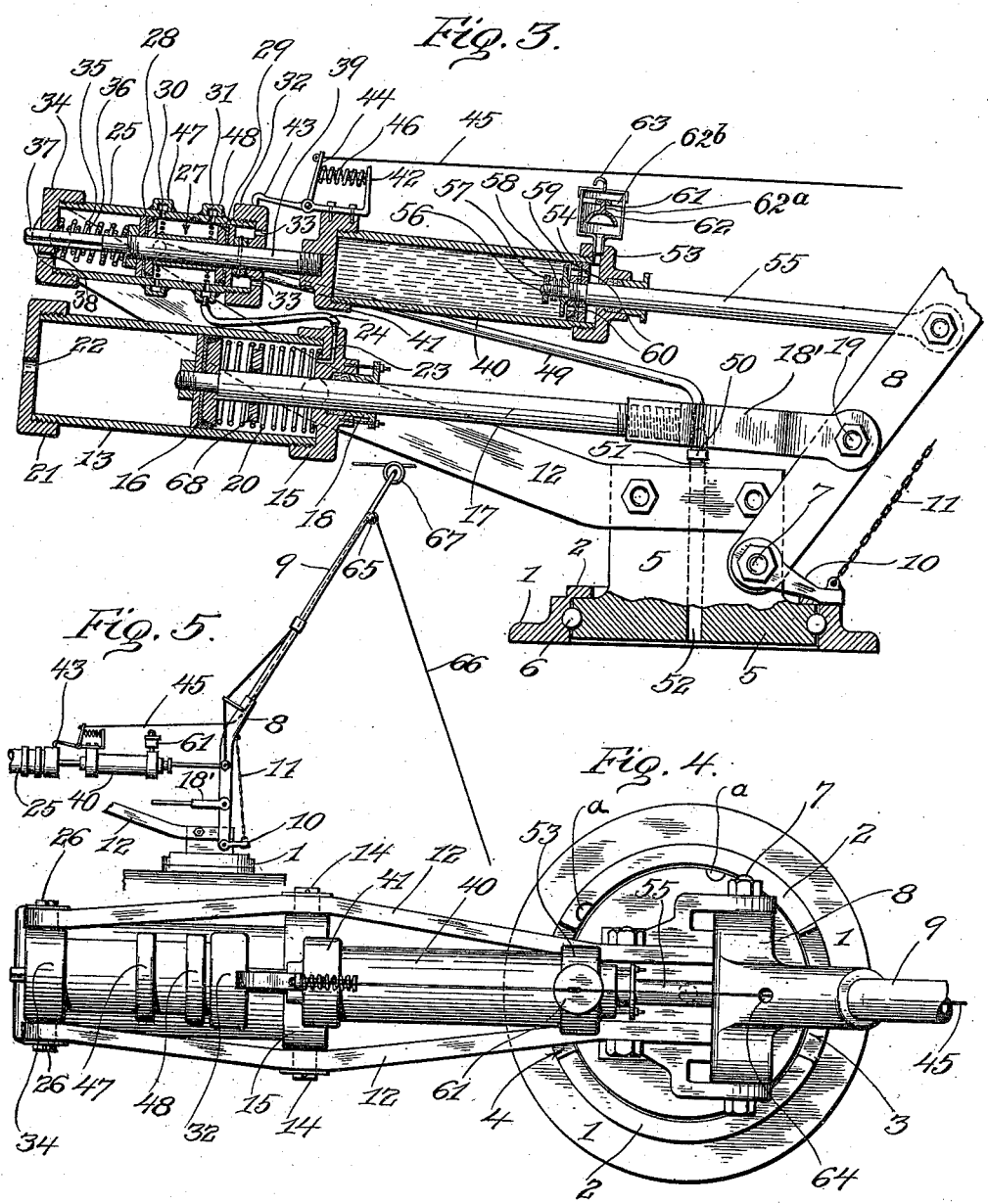

UNITED STATES PATENT OFFICE.

JAMES W. LANG, OF LOS ANGELES, CALIFORNIA.

AUTOMATIC TROLLEY-POLE.

984,767.  Specification of Letters Patent.  Patented Feb. 21, 1911.

Application filed August 11, 1909. Serial No. 512,403.

*To all whom it may concern:*

Be it known that I, JAMES W. LANG, a citizen of the United States, residing at Los Angeles, in the county of Los Angeles and State of California, have invented a new and useful Automatic Trolley-Pole, of which the following is a specification.

This invention relates to automatic trolley poles of that class wherein the pole is held elevated with the trolley resting against the wire by means of a piston and cylinder device, and the main object of the present invention is to provide for controlling the valve of such device through the medium of an intermediate hydraulic device, whereby, during the ordinary vertical movement of the pole which takes place as the car travels along, on account of the varying height of the wire, the piston of the hydraulic device operates slowly through the fluid in the cylinder, but when the trolley pole takes a quick movement, as when it jumps from the wire, the resulting quick movement of the piston, acting upon the fluid, moves the containing cylinder bodily and thus actuates the valve of the pneumatic device to permit the air to escape therefrom and allow the pole to drop as will be described hereinafter.

Referring to the drawings: Figure 1 is a side elevation of the pole operating device, partly in section, the parts being shown in the position which they have when the pole is elevated and the trolley is on the wire. Fig. 2 is a view similar to Fig. 1, showing the position of the parts when the trolley has jumped from the wire and before being depressed. Fig. 3 is a view similar to Fig. 1, showing the position of the parts after the pole has been depressed and the valve has been manually restored to cause the pole to be lifted. Fig. 4 is a plan view. Fig. 5 is a side elevation of the complete pole with the adjacent parts of the operating device.

1 designates the base which has a rim 2 provided with two segmental notches 3 and 4. Rotatable in the base 1 is a swivel 5 journaled on ball-bearings 6. The balls may be inserted through a hole formed by bringing two half round recesses *a* into register by turning the swivel 5. A bolt 7 extends through the swivel 5 and pivoted thereon is a lower fork 8 of the trolley pole 9. Also pivoted on the bolt 7 is a dog 10 which is adapted to drop into the notch 3 or the notch 4 according to the position of the trolley pole when the trolley pole drops and which then acts as a positive brake or stop to restrict the swinging movement of the swivel 5 and attached trolley pole to an arc permitted by the notch 3 or 4. The dog 10 is normally held out of the notch 3 or 4 while the trolley is on the wire by a chain 11 which at one end is secured to the dog 10 and at the other end to the fork 8, as clearly shown in Figs. 1, 2 and 5. When the trolley pole drops the chain 11 slackens, which allows the dog 10 to drop into the notch, while, when the trolley pole is raised, the tightening of the chain 11 automatically lifts the dog out of the notch.

Extending forwardly from the swivel 5 is a frame consisting of two arms 12. A pneumatic cylinder 13 is pivotally mounted on the arms 12 by means of trunnions 14 which extend from a head 15 screwed on the cylinder 13. Within the cylinder 13 is a piston 16 and a piston rod 17 extends from the piston 16 through a stuffing box 18 to the fork 8 of the trolley pole 9, the piston rod 17 being screwed into the end of a fork 18', the latter being pivoted at 19 to the fork 8. A compression spring 20 is arranged in the cylinder 13 between the head 15 and piston 16 and acts as a buffer to cushion the downward drop of the trolley pole. A head 21 screwed on the forward end of the cylinder 13 is provided with a large port 22 which places the forward end of the cylinder in constant communication with the atmosphere.

Compressed air is supplied to the rear end of the cylinder 13 through a port 23 formed in the head 15, the air being conducted thereto through a flexible pipe 24 which extends from a valve cylinder 25, the latter being pivoted at 26 to the arms 12. Within the cylinder 25 is a valve 27 consisting of two pistons 28 and 29 which are connected with each other and which respectively are adapted to control the ports 30 and 31. Screwed to the rear end of the cylinder 25 is a head 32 having exhaust ports 33 and a head 34 is screwed to the opposite end of the cylinder 25. Between the head 34 and piston 28 is a coil spring 35, the function of which will be described and a smaller spring 36 is also similarly located and acts as a buffer spring.

A square extension 37 extends from the valve 27 through the head 34 preventing the valve from turning, and the cylinder 25 is provided with a port 38 which places the front end of the cylinder 25 in communication with the atmosphere. The extension 37 acts as a support for the springs 35 and 36.

Extending rearwardly from the valve 27 is a piston rod 39 to which is secured a hydraulic cylinder 40, the latter being screwed to a head 41, which in turn is screwed to piston rod 39. Secured to the head 41 is a bracket 42 to which is pivoted a dog 43 having an arm 44 to which is connected a wire 45. A compression spring 46 serves to hold the dog 43 depressed.

Surrounding the perforations 30 is a hollow chamber 47, while surrounding the perforations 31 is a hollow chamber 48. Compressed air is conducted to the chamber 47 through a pipe 49 which connects through a swivel joint 50 with a pipe 51 at the upper end of a central air passage 52 in the swivel 5.

Secured to the rear end of the cylinder 40 is a head 53 and within the cylinder 40 is a piston 54 which is connected by a piston rod 55 with the fork 8. The piston rod 55 has a reduced end 56 on which is a nut 57 thereon confining a spring 58, which in turn bears against a valve plate 59, the latter serving to partially close ports 60 in the piston 54, the plate being shouldered, which prevents the face of the plate from coming into complete contact with the face of the piston 54 so that the ports 60 therein are not entirely closed by the plate 59 even when the latter is pressed against the piston by the spring 58. The space between the plate 59 and piston 54 is sufficient to permit the piston 54 to gradually move in either direction in the cylinder 40 to accommodate the gradual swing of the pole which occurs during the normal operation of the car. However, a sudden movement of the piston to the left of the cylinder 40 will be checked, as the liquid cannot pass quickly enough through the small space between the plate and the piston to enter and flow through the ports 60, and this will result in moving the cylinder 40 and parts attached thereto, bodily forward, as will be explained. During the rearward movement of the piston however, it is not checked, because the plate is pushed forward by the pressure of the liquid, the spring yielding, which fully opens the ports 60, permitting the free movement of the piston in this direction.

Secured to the head 53 is a hollow chamber 61 which communicates with the cylinder 40 and within the chamber 61 is an oil spreader 62 which is held stationary in the chamber 61 by a web 62ª, the latter forming part of a spider 62ᵇ, the spider being rigidly secured within the chamber 61. There is a space between the lower edge of the spreader 62 and the bottom of the chamber 61. The upper end of the chamber 61 communicates with the atmosphere through a small pipe 63, the end of which is curved downwardly, so that water can not enter the chamber, although air may slowly pass therethrough. One purpose of the chamber 61 is to provide for the variation in the capacity of the cylinder 40 due to the varying amount of volume occupied therein by the piston rod 55. When the piston 54 moves to the right from the position shown in Figs. 1 and 2, during about the first seven inches of its movement, it moves with such great rapidity that although the outwardly moving piston rod 55 increases the capacity of the cylinder 40, the extreme speed of movement of the piston is such that the transfer of oil from the right hand side of the piston to the left hand side thereof does not occur with a corresponding rapidity and oil from the right hand side of the piston is forced up momentarily into the chamber 61. The pipe 63 is from a quarter to three-eighths of an inch in diameter, and even though the pipe 63 is downwardly curved, when this sudden inrush of oil into the chamber 61 takes place, I have found that without the spreader 62, the oil is forced out through the curved pipe 63, but with the stationary spreader 62, the oil from the cylinder 40 is forced against the concave under side of the spreader 62 and its direction is changed and it must flow down and over the bottom rim of the spreader 62 before it can move up in the chamber 61. This interrupts the sudden upward passage of the oil in the chamber 61 and causes the oil to be diffused in the lower part thereof and gives the air a chance to escape out of the chamber 61 through the pipe 63. This all takes place, as stated, during about the first seven inches of movement of the piston 54 to the right, at which time it is moving with extreme speed. During the remainder of the stroke of the piston 54 to the right, the piston rod 55 is removed from the cylinder 40 and the volume of oil in the cylinder 40 is thus increased for the oil which had been forced up into the chamber 61 gradually reënters the cylinder 40.

The wire 45 passes through a hole 64 as shown in Fig. 4, thence up through the trolley pole 9 and over a sheave 65, as shown in Fig. 5. Attached to the end of the wire 45 is a trolley rope 66 which forms a continuation thereof.

67 designates the trolley wheel.

68 is a disk loose on piston rod 17 which supports the spring 20, when the piston is away from it as in Figs. 1 and 2.

In the operation of the device, the parts stand in the position shown in Fig. 1 in which the compressed air is back of the piston 16 and the latter is held in the forward part of the cylinder, thereby, through the medium of the piston rod 17, holding the trolley pole elevated with the trolley resting against the wire. With the parts in this position, air is admitted to the cylinder 13 through the pipe 24 which is in communication with chamber 48, the latter being in communication through the space between the two pistons 28 and 29, with the chamber 47, the latter receiving air from the pipe 49. As the car moves along, the trolley pole gradually moves up and down owing to the varying height of the wire and during such normal movement of the pole, the piston 54 slowly moves back and forth in its cylinder 40, ports 60 being of a size which permit a sufficiently rapid circulation of liquid therethrough for this purpose, so that during this gradual vertical play of the trolley pole no movement is imparted to the valve 27, the latter being firmly held in normal position by the two springs 35 and 36. When the trolley wheel flies off from the wire the pole takes a quick upward movement which suddenly advances the piston 54 at a speed faster than the liquid can pass through the ports 60 and thus advances the cylinder 40 bodily, which through piston rod 39 moves forward the valve 27, so that piston 29 crosses over the ports 31 and places the latter in communication with ports 33, whereupon the air from within the cylinder 13 passes backwardly through pipe 24 and through ports 31 and thence through ports 33 to the atmosphere. As the cylinder 40 moves forward, as described, the dog 43 engages the head 32, the parts taking the position shown in Fig. 2, and air now being allowed to escape from the cylinder 13, no support is given to the trolley pole to hold it up and it falls. As it falls the chain 11 slackens and the dog 10 drops into the notch 3, so that the pole can only swing laterally a limited distance. The dog 43 remains in engagement with the head 32 when the pole drops and after it drops, so that the springs 35 and 36 are both prevented from pushing the piston 27 rearwardly and thus air is prevented from passing into the cylinder 13. In order to raise the pole, therefore, it is necessary to shift the valve 27 and this is accomplished by pulling on the trolley rope 66 which acting through wire 45 releases the dog 43 from the head 32, whereupon the springs 35 and 36 expand and move the valve 27 back, at the same time moving the piston rod 39 and clyinder 40, the parts taking the position shown in Fig. 3, and as soon as piston 29 passes ports 31, compressed air is again admitted through ports 31 and pipe 24 to cylinder 13 and the pressure acting against piston 16 moves up the trolley pole until the trolley rests against the wire and the pressure holds the pole up after the trolley is in contact with the wire.

What I claim is:

1. In a trolley pole, pneumatic means for moving the pole vertically, a valve for controlling the pneumatic means, a cylinder connected to said valve, a piston having a restricted fluid passage in said cylinder connected with the trolley pole, fluid in said cylinder, whereby sudden movement of the pole will cause the piston to act through the fluid and bodily move the cylinder to actuate the valve.

2. In a trolley pole, pneumatic means for moving the pole vertically, a valve 27 for controlling the pneumatic means, a cylinder 40 connected to said valve, a piston 54 having a restricted fluid passage in said cylinder, fluid in the cylinder, a connection between said piston and the trolley pole, and means for automatically locking said valve 27 when in position to exhaust to permit the pole to drop.

3. In a trolley pole, pneumatic means for moving the pole vertically, a valve for controlling the pneumatic means, a cylinder connected to said valve, a piston having a restricted fluid passage in said cylinder, fluid in the cylinder, a connection between said piston and the trolley pole, a dog on said cylinder and adapted to engage the valve casing, a connection extending from said dog to the trolley pole and along the same, said connection being attached to the trolley rope.

4. In a trolley pole, pneumatic means for moving the pole vertically, a valve for controlling the pneumatic means, a cylinder connected to said valve, a piston having a restricted fluid passage in said cylinder, fluid in the cylinder, a connection between said piston and the trolley pole, means for automatically locking said valve when in position to exhaust to permit the pole to drop, a chamber on the rear end of the cylinder in communication with the cylinder, and a fluid spreader within said chamber.

5. In a trolley pole, pneumatic means for moving the pole vertically, a valve for controlling the pneumatic means, a cylinder connected to said valve, a piston in said cylinder, fluid in the cylinder, a connection between said piston and the trolley pole, means for automatically locking said valve when in position to exhaust to permit the pole to drop, a reduced area of said piston being produced by ports formed in said piston, and a valve plate slidable into close proximity to the ports, whereby liquid can pass readily in one direction through the piston and a quick downward movement of the pole is permitted and whereby passage of liquid is restricted in the other direction and a quick raising movement prevented.

6. In a trolley pole, pneumatic means for moving the pole vertically, a valve for controlling said pneumatic means comprising a cylinder, a pair of pistons therein connected together, two sets of ports in said cylinder, one set of ports being in communication with said pneumatic means, an air supply connected to the other set of ports, the end of the cylinder adjacent the first mentioned ports having atmospheric ports, a piston rod extending through said cylinder and attached to both of said pistons, a hydraulic cylinder attached to said piston rod, a piston in the latter cylinder and having ports of a restricted area, and a piston rod extending from the latter piston to the trolley pole.

7. In a trolley pole, pneumatic means for moving the pole vertically, a valve for controlling said pneumatic means comprising a cylinder, a pair of pistons therein connected together, two sets of ports in said cylinder, one set of ports being in communication with said pneumatic means, an air supply connected to the other set of ports, the end of the cylinder adjacent the first mentioned ports having atmospheric ports, a piston rod extending through said cylinder and attached to both of said pistons, a hydraulic cylinder attached to said piston rod, a piston in the latter cylinder having a restricted fluid passage, a piston rod extending from the latter piston to the trolley pole, a bracket on the hydraulic cylinder, a dog pivoted to the bracket and adapted to engage a projection on the first named cylinder, a connection from said dog extending to and along the trolley pole, and a trolley rope connected to said connection.

8. In a trolley pole, a base, a swivel journaled therein, the trolley pole pivoted to the swivel, a pair of arms extending from the swivel, a first cylinder mounted on said arms, a piston therein, a piston rod extending from said piston to said trolley pole, a second cylinder mounted on said arms, valve means in the second cylinder, a rod extending from said valve means through the second cylinder, a third cylinder attached to said rod, a piston in the third cylinder connected with the trolley pole, and a communication from the valve means of the second cylinder to the first cylinder.

9. In a trolley pole, a base, a swivel journaled therein, the trolley pole pivoted to the swivel, a pair of arms extending from the swivel, a first cylinder pivoted to the arms, a second cylinder pivoted to the arms, a piston in the first cylinder, a piston rod extending therefrom to the trolley pole, valve means in the second cylinder, a flexible pipe extending from the second cylinder to the first cylinder, a rod extending from the valve means of the second cylinder, a third cylinder secured to said rod, a piston in the third cylinder, said piston having ports of a restricted area, a fluid in the third cylinder, and a connection from the latter piston to the trolley pole.

10. In a trolley pole, a base, a swivel journaled therein, the trolley pole pivoted to the swivel, a pair of arms extending from the swivel, a first cylinder pivoted to the arms, a second cylinder pivoted to the arms, a piston in the first cylinder, a piston rod extending therefrom to the trolley pole, valve means in the second cylinder, a flexible pipe extending from the second cylinder to the first cylinder, a rod extending from the valve means of the second cylinder, a third cylinder secured to said rod, a piston in the third cylinder, said piston having ports of a restricted area, a fluid in the third cylinder, a connection from the latter piston to the trolley pole, a projection screwed on the second cylinder, a dog pivotally supported on the third cylinder and adapted to engage said projection, and a connection from said dog extending to the trolley pole and along the same and connected to the trolley rope.

11. In a trolley pole, a base, a swivel journaled therein, a trolley pole pivoted to said swivel, a pair of arms extending from the swivel, a first cylinder pivoted to the arms, a second cylinder pivoted to the arms, a piston in the first cylinder, a piston rod extending therefrom to the trolley pole, valve means in the second cylinder, a flexible pipe extending from the second cylinder to the first cylinder, a rod extending from the valve means of the second cylinder, a third cylinder secured to said rod, a piston in the third cylinder, said piston having ports of a restricted area, a fluid in the third cylinder, a connection from the latter piston to the trolley pole, a projection screwed on the second cylinder, a dog pivotally supported on the third cylinder and adapted to engage said projection, and a connection from said dog extending to the trolley pole and along the same and connected to the trolley pole, a coil compression spring within the first cylinder, and a coil compression spring within the second cylinder.

In testimony whereof, I have hereunto set my hand at Los Angeles, California, this 3rd day of August, 1909.

JAMES W. LANG.

In presence of—
G. T. HACKLEY,
FRANK L. A. GRAHAM.